G. H. LEVIS.
LINING FOR REFRIGERATORS.

No. 190,973. Patented May 22, 1877.

UNITED STATES PATENT OFFICE.

GEORGE H. LEVIS, OF PHILADELPHIA, PENNSYLVANIA.

IMPROVEMENT IN LININGS FOR REFRIGERATORS.

Specification forming part of Letters Patent No. 190,973, dated May 22, 1877; application filed May 8, 1877.

*To all whom it may concern:*

Be it known that I, GEORGE H. LEVIS, of the city of Philadelphia, in the State of Pennsylvania, have invented a new and useful Improvement in Linings or Packing for Refrigerators, Water-Coolers, Soda-Water Fountains, &c., of which the following is a clear and exact description:

My invention relates to a new packing or lining for refrigerators, &c., whereby an even temperature is maintained in the interior of the refrigerator, &c., and the absorption of moisture by the packing or lining prevented.

Figure 1:
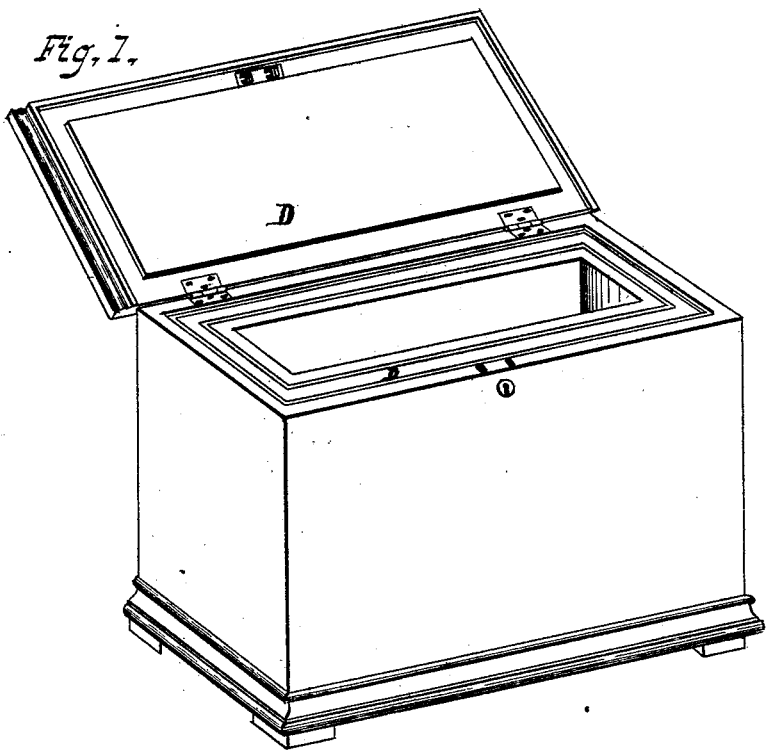
Figure 2:
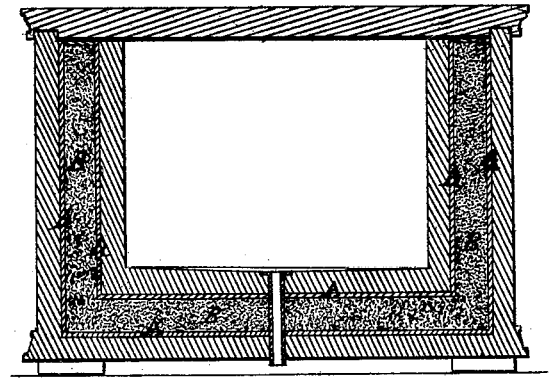

Figure 1 represents a perspective view of a refrigerator embodying my improvement. Fig. 2 is a vertical cross-section of same.

A A represent lamina of paper; B, a center filling of plaster-of-paris. D, Fig. 1, represents a coating or covering of soluble glass, or similar substance, which covers the paper forming a part of the lining or packing.

It is found, in practice, that a lining or packing as herein described, with a coating of soluble glass upon the outer sides of it, is a greater non-conductor, maintains a more even temperature, and prevents absorption of moisture better than any now known or used by manufacturers of refrigerators, &c., and to this end my invention applies.

Again, my invention is equally applicable to maintaining an even temperature in calorific as well as frigorific receptacles, such as coffee-urns, or similar vessels for containing hot liquids.

I am aware that paper and plaster-of-paris have both been used singly as a lining or packing for refrigerators, and to such use my invention does not apply; but What I do claim as new, and desire to secure by Letters Patent, is—

A packing or lining for refrigerators, coffee-urns, and other hot or cold air receptacles where an even temperature is required, composed of laminæ of paper, center filling of plaster-of-paris, and a coating of soluble glass or similar substance, substantially as and for the purpose set forth.

GEORGE H. LEVIS.

Witnesses:
 JNO. S. POWELL,
 ABRAM H. SMITH.